United States Patent
Paran et al.

(10) Patent No.: US 11,824,205 B2
(45) Date of Patent: Nov. 21, 2023

(54) SYSTEMS AND METHODS FOR REFURBISHING FUEL CELL STACK COMPONENTS

(71) Applicant: BLOOM ENERGY CORPORATION, San Jose, CA (US)

(72) Inventors: Drew Paran, San Jose, CA (US); Ali Delkaninia, San Jose, CA (US); Kendall Lui, San Francisco, CA (US); Tulin Akin, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 327 days.

(21) Appl. No.: 17/151,373

(22) Filed: Jan. 18, 2021

(65) Prior Publication Data

US 2022/0231305 A1    Jul. 21, 2022

(51) Int. Cl.
| | |
|---|---|
| *H01M 4/00* | (2006.01) |
| *H01M 4/88* | (2006.01) |
| *B23K 26/0622* | (2014.01) |
| *B23K 26/354* | (2014.01) |
| *H01M 8/2404* | (2016.01) |
| *B23K 26/06* | (2014.01) |
| *B23K 26/36* | (2014.01) |
| *H01M 8/008* | (2016.01) |

(Continued)

(52) U.S. Cl.
CPC .......... *H01M 4/8878* (2013.01); *B23K 26/06* (2013.01); *B23K 26/0622* (2015.10); *B23K 26/0626* (2013.01); *B23K 26/354* (2015.10); *B23K 26/36* (2013.01); *H01M 8/008* (2013.01); *H01M 8/2404* (2016.02); *B23K 26/362* (2013.01); *B23K 26/38* (2013.01)

(58) Field of Classification Search
CPC ......... H01M 8/008–0276; B23K 26/00–00661
See application file for complete search history.

(56) References Cited

U.S. PATENT DOCUMENTS

| | | | | |
|---|---|---|---|---|
| 5,124,175 A | * | 6/1992 | Miracky | ................ H05K 3/225 |
| | | | | 427/97.8 |
| 5,493,076 A | | 2/1996 | Levite et al. | |
| 7,452,441 B2 | | 11/2008 | Xie | |

(Continued)

FOREIGN PATENT DOCUMENTS

WO    WO2005/076394 A2    8/2005

OTHER PUBLICATIONS

Krishnan, Arun, and Fengzhou Fang. Frontiers of Mechanical Engineering 14 (2019): 299-319 (Year: 2019).*

(Continued)

*Primary Examiner* — Milton I Cano
*Assistant Examiner* — Albert Michael Hilton
(74) *Attorney, Agent, or Firm* — THE MARBURY LAW GROUP PLLC

(57) ABSTRACT

A method of refurbishing a singulated fuel cell stack interconnect includes scanning a first pulsed laser beam on an air side of the interconnect to vaporize seal and corrosion barrier layer residue without vaporizing a metal oxide layer located on the air side of the interconnect below the corrosion barrier layer residue, and scanning a second pulsed laser beam which is different from the first pulsed laser beam on the exposed metal oxide layer on the air side of the interconnect to reflow the metal oxide layer without removing the metal oxide layer.

19 Claims, 7 Drawing Sheets

(51) Int. Cl.
*B23K 26/362* (2014.01)
*B23K 26/38* (2014.01)

(56) References Cited

U.S. PATENT DOCUMENTS

| | | |
|---|---|---|
| 7,713,649 B2 | 5/2010 | Hickey et al. |
| 7,758,983 B2 | 7/2010 | Suzuki et al. |
| 8,182,956 B2 | 5/2012 | Hickey et al. |
| 8,535,841 B1 | 9/2013 | Gasda et al. |
| 9,059,455 B2 | 6/2015 | Gasda et al. |
| 9,583,771 B2 | 2/2017 | Parihar et al. |
| 10,756,355 B2 | 8/2020 | Seiki et al. |
| 2005/0173061 A1 | 8/2005 | Xie |
| 2006/0204827 A1 | 9/2006 | Hickey et al. |
| 2007/0082250 A1 | 4/2007 | Suzuki et al. |
| 2009/0033410 A1* | 2/2009 | Nelson ............... H03K 17/567 327/581 |
| 2012/0244448 A1 | 9/2012 | Hallum et al. |
| 2014/0004448 A1 | 1/2014 | Gasda et al. |
| 2014/0342267 A1* | 11/2014 | Parihar ............... H01M 8/2432 429/465 |
| 2017/0244114 A1* | 8/2017 | Seiki ..................... H01M 8/008 |
| 2019/0101748 A1* | 4/2019 | Hiereth .............. G02B 27/0006 |

OTHER PUBLICATIONS

Rezazadeh, L., S. Baghshahi, A. Nozad Golikand, and Z. Hamnabard. Ionics 20 (2014): 55-64 (Year: 2014).*

Extended Search Report and Written Opinion from the European Patent Office (EPO) for European Patent Application No. 22150917.7-1108, dated Jun. 14, 2022, 7 pages.

U.S. Appl. No. 16/988,497, filed Aug. 7, 2020, Bloom Energy Corporation.

* cited by examiner

SYSTEMS AND METHODS FOR REFURBISHING FUEL CELL STACK COMPONENTS

FIELD

The present disclosure is directed to systems and methods for refurbishing fuel cell stack components in general, and to using a laser to remove seal and ceramic barrier material from fuel cell interconnects.

BACKGROUND

A typical solid oxide fuel cell (SOFC) stack includes multiple SOFCs separated by interconnects (ICs) which provide both electrical connection between adjacent cells in the stack and channels for delivery and removal of fuel and oxidant. When hydrocarbons are used for fuel, some of the hydrocarbons may catalytically decompose or crack on the surface of the interconnect, leaving a deposit of coke. These coke deposits can clog the channels adversely affecting the performance of the fuel cell stack.

The fuel cell stack may be reconditioned by refurbishing the ICs. A typical IC refurbishment process may include the following steps: (1) singulation (separating interconnects and individual fuel cells in a stack from one another), (2) removal of electrolyte debris from the interconnects, (3) removal of any other remaining internal stack components (if any) from the interconnects and (4) removal of seals and protective coatings.

Prior singulation methods include mechanically prying the stack apart using a hand held tool. This process is time-consuming and prone to damaging the interconnects, by chipping, cracking, or inducing camber (curvature).

After singulation, most of the electrolyte can be scraped off, but material left around the seal region is typically very well adhered to the IC and hard to remove. The last step to achieving a clean part is typically removing the metal oxide (e.g., chromium oxide) that grows on the fuel side of the chromium alloy interconnects and residual seal material. A grit blasting process typically used in removing these oxides is costly, time consuming, difficult to control, and can cause damage to the part by inducing camber and excessive erosion of the part.

SUMMARY

According to various embodiments a method of refurbishing a singulated fuel cell stack interconnect includes scanning a pulsed laser beam on an air side of the interconnect to vaporize seal and corrosion barrier layer residue without vaporizing a metal oxide layer located on the air side of the interconnect below the corrosion barrier layer residue, and scanning a second pulsed laser beam which is different from the first pulsed laser beam on the exposed metal oxide layer on the air side of the interconnect to reflow the metal oxide layer without removing the metal oxide layer.

According to various embodiments, a method of coating a fuel cell stack interconnect comprising fuel holes extending through the interconnect, air channels located on the air side of the interconnect, ring seal regions surrounding the fuel holes located on the air side of the interconnect, and a metal oxide layer located on the air side of the interconnect, the method comprising forming microcavities through the metal oxide layer in the seal ring regions by laser drilling, depositing a corrosion barrier layer on the metal oxide layer and into the microcavities at least on the seal ring regions; and depositing a seal material on the corrosion barrier layer in the seal ring regions.

DETAILED DESCRIPTION

Figure 1A:
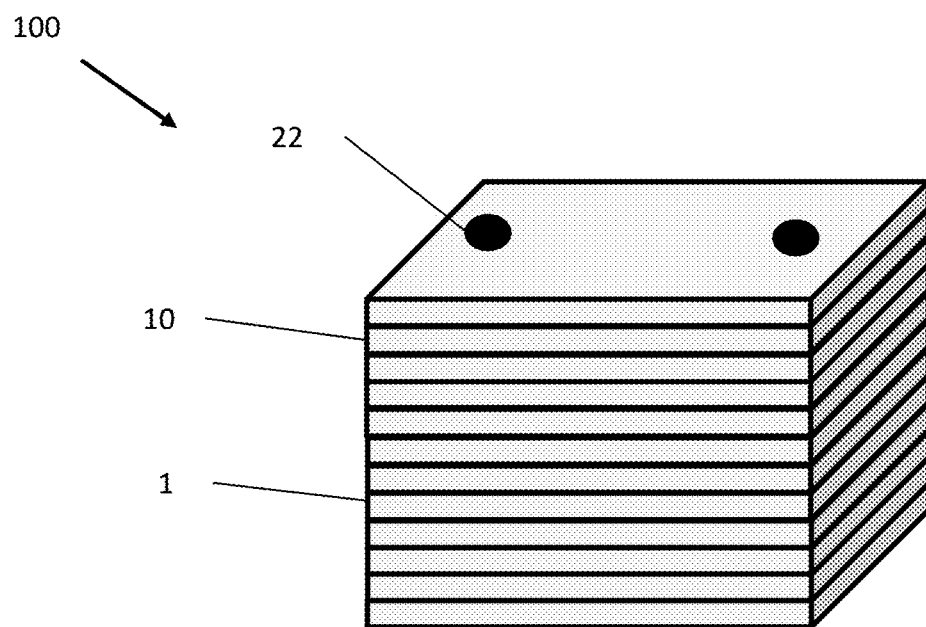
FIG. 1A is a perspective view of a SOFC stack, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%. In addition, weight percentages (wt %) and atomic percentages (at %) as used herein respectively refer to a total weight or number of atoms of a corresponding composition.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected directly to power conditioning equipment and the power (i.e., electricity) output of the stack or comprises a portion of a fuel cell column that contains terminal plates which provide electrical output.

Various embodiments include methods for refurbishing components, such as interconnects (ICs), of a fuel cell stack, such as a solid oxide fuel cell (SOFC) stack. Embodiments include methods of singulating, electrolyte removal, seal and ceramic barrier removal, and interconnect coating rejuvenation. The various methods of singulating, electrolyte removal, seal and ceramic barrier removal and interconnect coating rejuvenation may be used either singly or in combination or in combination with conventional techniques.

Figure 1B:
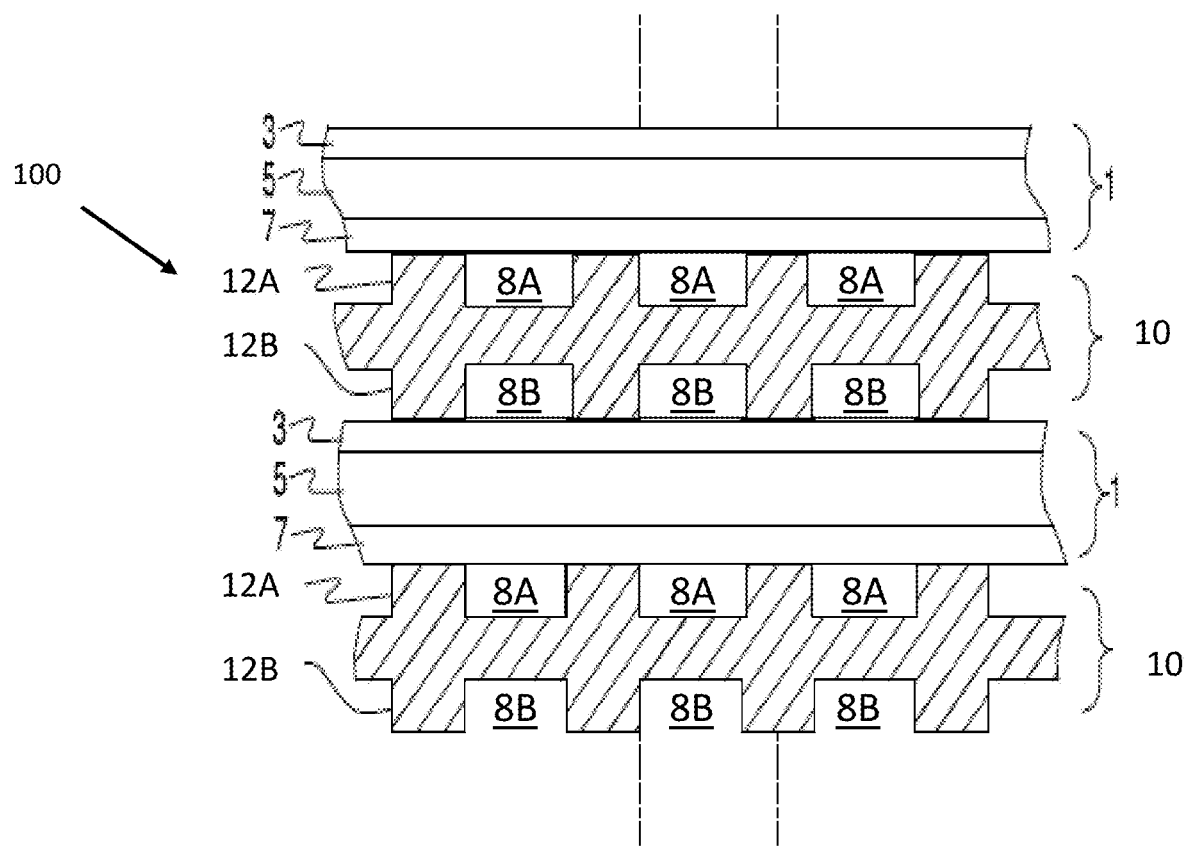
FIG. 1B is a cross-sectional view of a portion of the stack of FIG. 1A.

FIG. 1A is a perspective view of a fuel cell stack 100, and FIG. 1B is a sectional view of a portion of the stack 100, according to various embodiments of the present disclosure. Referring to FIGS. 1A and 1B, the stack 100 may be a solid oxide fuel cell (SOFC) stack that includes fuel cells 1 separated by interconnects 10. Referring to FIG. 1B, each fuel cell 1 comprises a cathode 3, a solid oxide electrolyte 5, and an anode 7.

Various materials may be used for the cathode 3, electrolyte 5, and anode 7. For example, the anode 7 may comprise a cermet layer comprising a metal-containing phase and a ceramic phase. The metal-containing phase may include a metal catalyst, such as nickel (Ni), cobalt (Co), copper (Cu), alloys thereof, or the like, which operates as an electron conductor. The metal catalyst may be in a metallic state or may be in an oxide state. For example, the metal catalyst forms a metal oxide when it is in an oxidized state. Thus, the anode 7 may be annealed in a reducing atmosphere prior to operation of the fuel cell 1, to reduce the metal catalyst to a metallic state.

The metal-containing phase may include nickel in a reduced state. This nickel-containing phase may form nickel oxide when it is in an oxidized state. Thus, the anode 7 is preferably annealed in a reducing atmosphere prior to operation to reduce the nickel oxide to nickel.

According to some embodiments, the metallic phase may include the metal catalyst and a dopant. For example, the metallic phase may be represented by Formula 1: $[D_xM_{1-x}]_yO$. In Formula 1, D is a dopant (in any oxidation state) selected from magnesium (Mg), calcium (Ca), titanium (Ti), aluminum (Al), manganese (Mn), tungsten (W), niobium (Nb), chromium (Cr), iron (Fe), vanadium (V), praseodymium (Pr), cerium (Ce), zirconium (Zr) or the like, or any combination thereof. In some embodiments, D may be Ca, Mg, and/or Ti. M is a metal catalyst selected from nickel (Ni), cobalt (Co), copper (Cu), or alloys thereof. X may range from about 0.01 to about 0.1, and y may range from about 1 to about 2. In other embodiments, x may range from about 0.01 to about 0.04. For example, x may be about 0.02 and y may be either 1 or 2.

Accordingly, the metallic phase may comprise from about 1 to about 10 atomic percent ("at %") of the metal oxide dopant and about 99 to about 90 at % of the metal catalyst. For example, the metallic phase may comprise from about 2 to about 4 at % of the metal oxide dopant and about 98 to about 96 at % of the metal catalyst, as manufactured before being reduced.

The ceramic phase of the anode 7 may include, but is not limited to gadolinia-doped ceria (GDC), samaria-doped ceria (SDC), ytterbia-doped ceria (YDC), scandia-stabilized zirconia (SSZ), ytterbia-ceria-scandia-stabilized zirconia (YCSSZ), or the like. In the YCSSZ, scandia may be present in an amount equal to 9 to 11 mol %, such as 10 mol %, ceria may present in amount greater than 0 (e.g., at least 0.5 mol %) and equal to or less than 2.5 mol %, such as 1 mol %, and at least one of yttria and ytterbia may be present in an amount greater than 0 and equal to or less than 2.5 mol %, such as 1 mol %, as disclosed in U.S. Pat. No. 8,580,456, which is incorporated herein, by reference. Yttria stabilized zirconia (YSZ) may be excluded from the ceramic phase of the anode 7.

The electrolyte 5 may comprise a stabilized zirconia, such as scandia-stabilized zirconia (SSZ), yttira-stabilized zirconia (YSZ), scandia-ceria-stabilized zirconia (SCSZ), scandia-ceria-yttira-stabilized zirconia (SCYSZ), or the like. Alternatively, the electrolyte 5 may comprise another ionically conductive material, such as a samaria-doped ceria (SDC), gadolinium-doped ceria (GDC), or yttria-doped ceria (YDC).

The cathode 3 may comprise a layer of an electrically conductive material, such as an electrically conductive perovskite material, such as lanthanum strontium manganite (LSM). Other conductive perovskites, such as lanthanum strontium cobaltite (LSC), lanthanum strontium cobalt manganite (LSCM), lanthanum strontium cobalt ferrite (LSCF), lanthanum strontium ferrite (LSF). $La_{0.85}Sr_{0.15}Cr_{0.9}Ni_{0.1}O_3$ (LSCN), etc., or metals, such as Pt, may also be used. The cathode 3 may also contain a ceramic phase similar to the anode 7. The electrodes and the electrolyte may each comprise one or more sublayers of one or more of the above described materials.

Furthermore, if desired, additional contact or current collector layers may be placed over the cathode 3 and anode 7, while additional interfacial layers, such as doped ceria interfacial layers, may be located between the electrodes 3, 7 and the electrolyte 5. For example, a Ni or nickel oxide anode contact layer and an LSM or LSCo cathode contact layer may be formed on the anode 7 and cathode 3 electrodes, respectively.

Fuel cell stacks are frequently built from a multiplicity of fuel cells 1 in the form of planar elements, tubes, or other geometries. Although the fuel cell stack 100 in FIG. 1A is vertically oriented, fuel cell stacks may be oriented horizontally or in any other direction. Fuel and air may be provided to the electrochemically active surface, which can be large. For example, fuel may be provided through fuel holes 22 (e.g., fuel riser openings) formed in each interconnect 10 and fuel cell 1, while air may be provided from the side of the stack between air side ribs of the interconnects 10.

Each interconnect 10 electrically connects adjacent fuel cells 1 in the stack 100. In particular, an interconnect 10 may electrically connect the anode 7 of one fuel cell 1 to the cathode 3 of an adjacent fuel cell 1. FIG. 1B shows that the lower fuel cell 1 is located between two interconnects 10. A Ni mesh (not shown) may be used to electrically connect the interconnect 10 to the anode 7 of an adjacent fuel cell 1.

Each interconnect 10 includes fuel-side ribs 12A that at least partially define fuel channels 8A and air-side ribs 12B that at least partially define oxidant (e.g., air) channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion to that of the solid oxide electrolyte in the cells (e.g., a difference of 0-10%). For example, the interconnects 10 may comprise a metal (e.g., a chromium-iron alloy, such as 4-6 weight percent iron, optionally 1 wt % or less yttrium and balance chromium alloy), and may electrically connect the anode or fuel-side of one fuel cell 1 to the cathode or air-side of an adjacent fuel cell 1. An electrically conductive contact layer, such as a nickel contact layer, may be provided between anodes 7 and each interconnect 10. Another optional electrically conductive contact layer may be provided between the cathodes 3 and each interconnect 10.

Figure 2A:
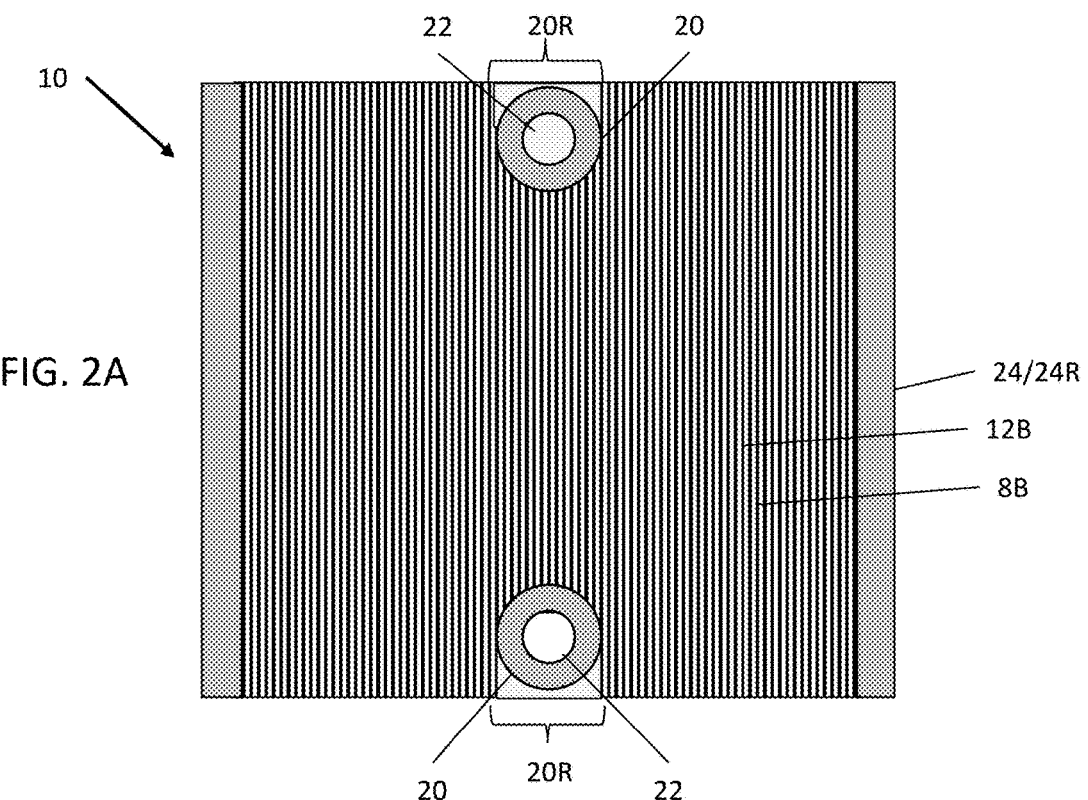
FIG. 2A is a plan view of an air side of an interconnect, according to various embodiments of the present disclosure.
Figure 2B:
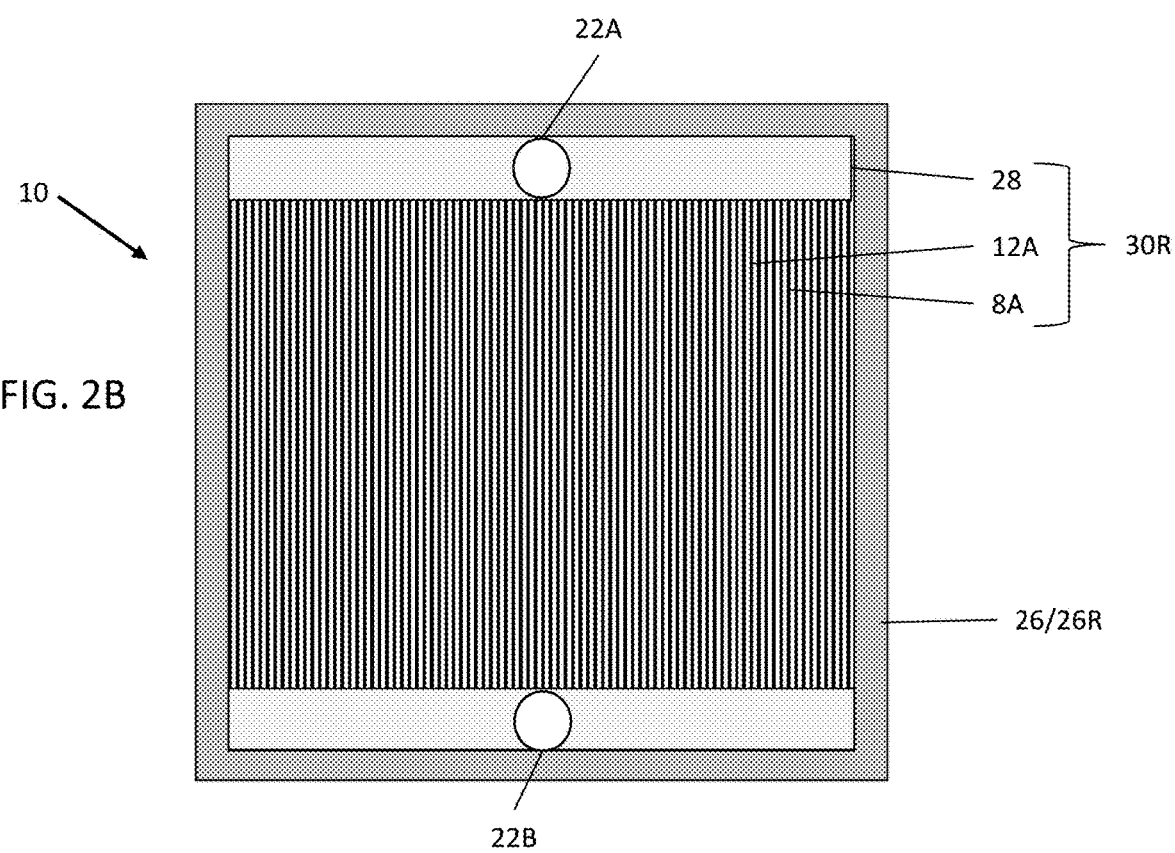
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges of the interconnect 10. Air flows through the air channels 8B to a cathode 3 of an adjacent fuel cell 1.

The interconnect 10 may include ring seal regions 20R that surround the fuel holes 22. Ring seals 20 may be disposed in the ring seal regions 20R, surrounding the fuel holes 22, to prevent fuel from contacting the air side of the interconnect 10. The air side of the interconnect 10 may include strip seal regions 24R disposed on opposing edges of the interconnect 10. Elongated rectangular seals 24 (e.g., strip seals) may be disposed on the strip seal regions 24R. The ring and strip seals 20, 24 may be formed of a glass or glass-ceramic material. The ring seal regions 22R and the strip seal regions 24R may be planar elevated regions that do not include ribs or channels. The surfaces of the ring seal regions 22R and the strip seal regions 24R may be coplanar with tops of the ribs 12B.

Referring to FIGS. 1B and 2B, the fuel side of the interconnect 10 may include a fuel flow region 30R including the fuel channels 8A and fuel manifolds 28. Fuel flows from one of the fuel holes 22 (e.g., inlet fuel hole that forms part of the fuel inlet riser), into the adjacent manifold 28, through the fuel channels 8A, and to an anode 7 of an adjacent fuel cell 1. Excess fuel may flow into the other fuel manifold 28 and then into the other fuel hole 22. A frame seal 26 is disposed on a frame seal region 26R of the fuel side of the interconnect 10. The frame seal region 26R may be an elevated plateau which does not include ribs or channels. The surface of the frame seal region 26R may be coplanar with tops of the ribs 12A.

Figure 3A:
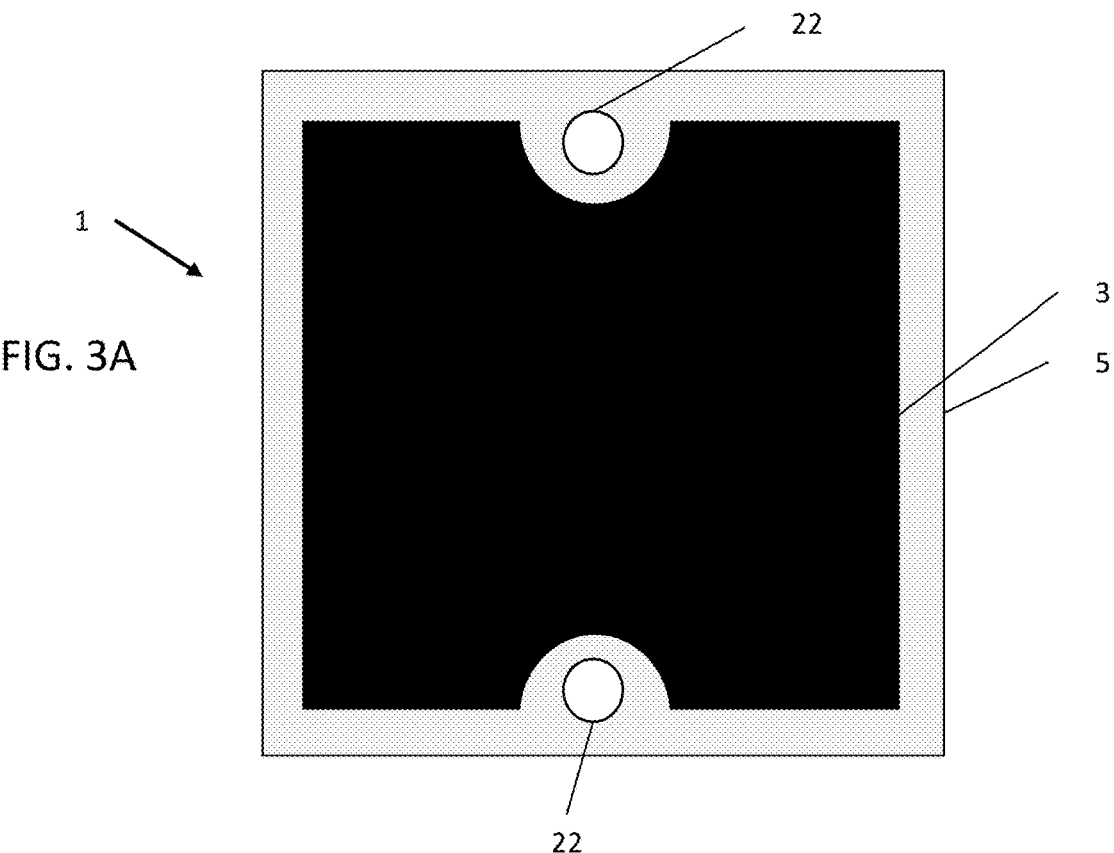
FIG. 3A is a plan view of an air side of a fuel cell, according to various embodiments of the present disclosure.
Figure 3B:
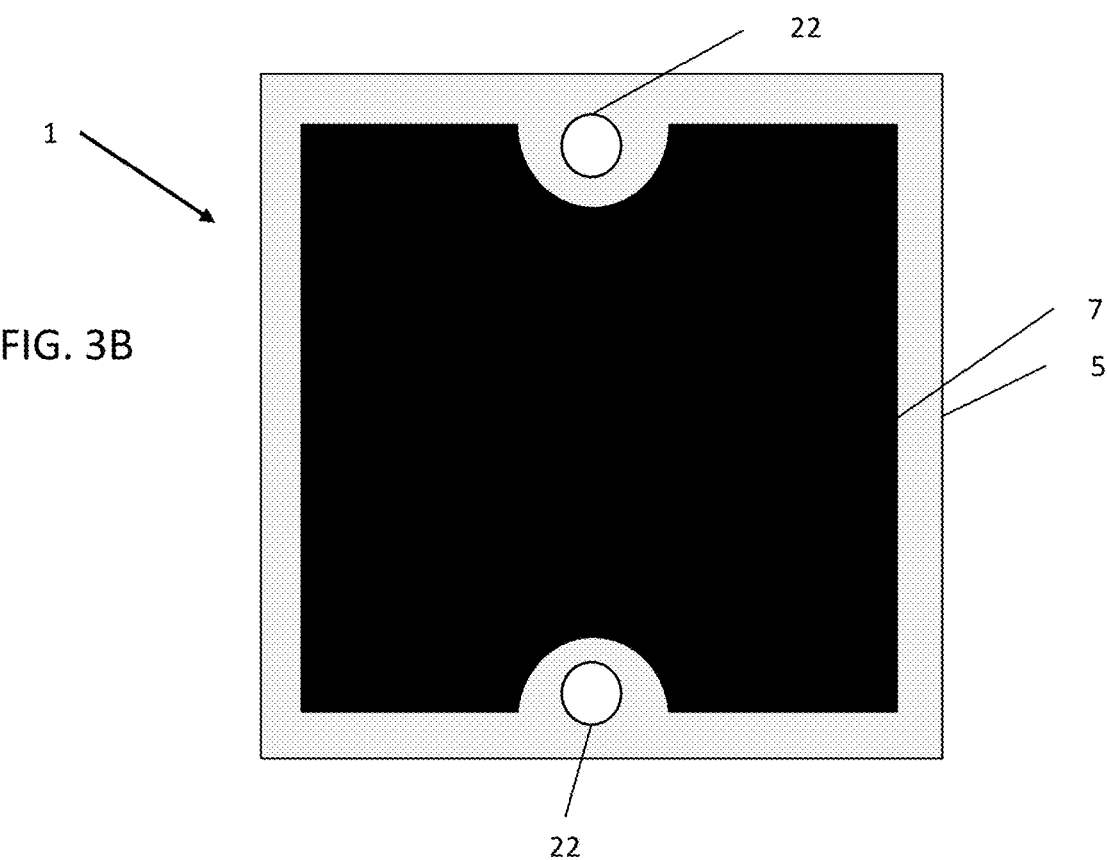
FIG. 3B is a plan view of a fuel side of the fuel cell of FIG. 3A.

FIG. 3A is a plan view of a cathode side (e.g., air side) of the fuel cell 1, and FIG. 3B is a plan view of an anode side (e.g., fuel side) of the fuel cell 1, according to various embodiments of the present disclosure. Referring to FIGS. 1A, 1B, 3A, and 3B, the fuel cell 1 may include fuel holes 22, the electrolyte 5, the cathode 3 and the anode 7. The cathode 3 may be disposed on a first side of the electrolyte 5. The anode 7 may be disposed on an opposing second side of the electrolyte 5.

The fuel holes 22 may extend through the electrolyte 5 and may be arranged to overlap with the fuel holes 22 of the interconnects 10, when assembled in the fuel cell stack 100. The cathode 3 may be printed on the electrolyte 5 so as not to overlap with the ring seals 20 and the strip seals 24 when assembled in the fuel cell stack 100. The anode 7 may have a similar shape as the cathode 3. The anode 7 may be disposed so as not to overlap with the frame seal 26, when assembled in the stack 100. In other words, the cathode 3 and the anode 7 may be recessed from the edges of the electrolyte 5, such that corresponding edge regions of the electrolyte 5 may directly contact the corresponding seals 20, 24, 26.

Figure 4:
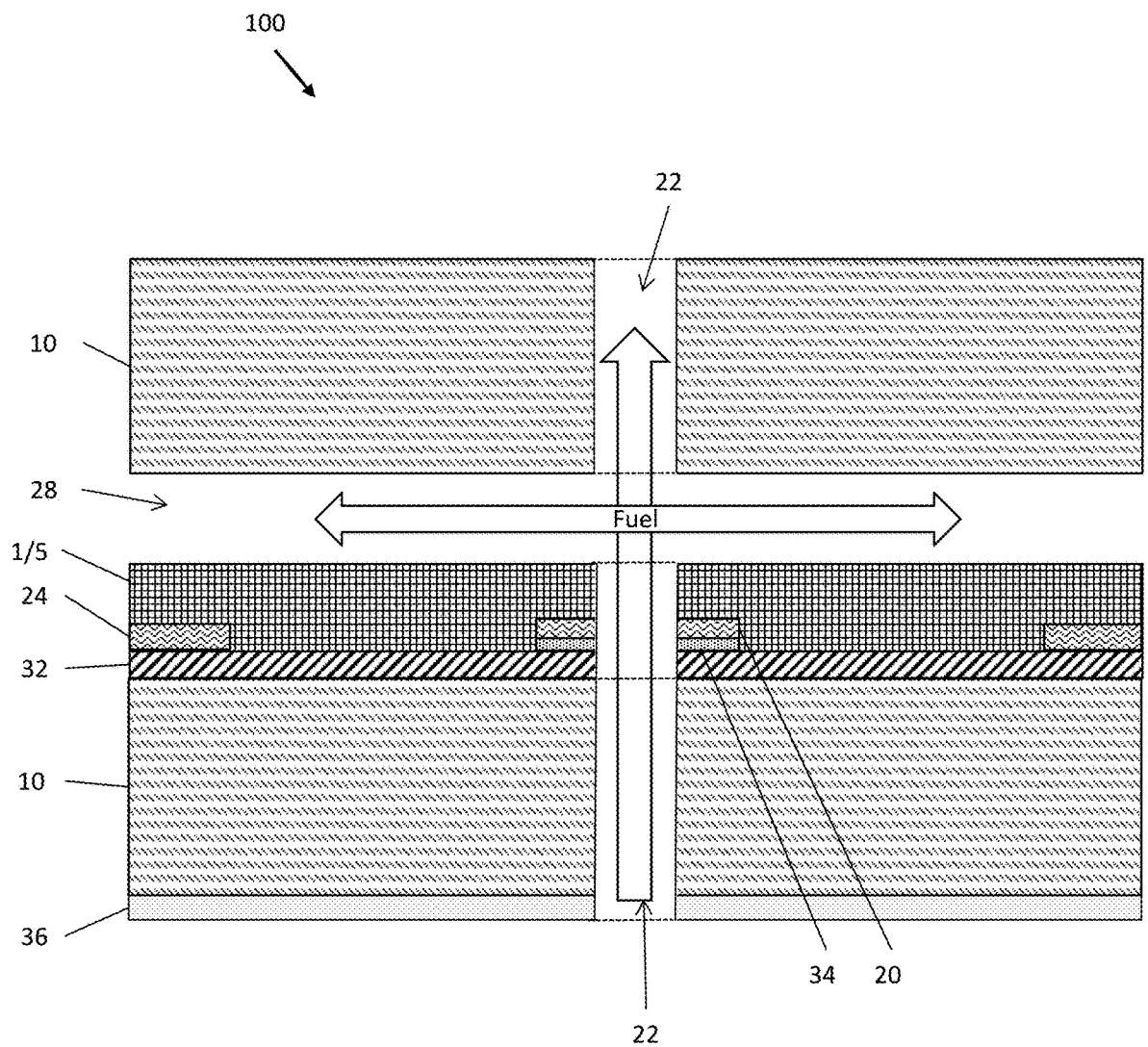
FIG. 4 is a cross-sectional view of a fuel cell stack including interconnects that include a metal oxide coating and a corrosion barrier layer, according to various embodiments of the present disclosure.

FIG. 4 is a cross-sectional view of a fuel cell 1 and adjacent interconnects 10 of a fuel cell stack 100, according to various embodiments of the present disclosure. The features of the lower interconnect 10 of FIG. 4 are shown in detail. However, both interconnects 10 may have the same features. A metal oxide coating or layer 32 may be disposed on the air sides of the interconnects 10, and a corrosion barrier layer 34 may be disposed on the metal oxide layer 32. The metal oxide layer 32 may be formed of, for example, lanthanum strontium manganite ("LSM") and/or manganese cobalt oxide ("MCO") spinel coating materials and may be disposed on the air side ribs 12B and/or in the air channels 8B of the interconnects 10.

The corrosion barrier layer 34 may be disposed on the metal oxide layer 32 at least below the ring seals 20. In some embodiments, the corrosion barrier layer 34 may optionally also be disposed below the strip seals 24, or may cover the entire metal oxide layer 32. The corrosion barrier layer 34 may operate as a barrier to diffusion of at least one of manganese or cobalt from a metal oxide layer 32 into the ring seals 20. Specifically, the corrosion barrier layer 34 preferably lacks any Mn and/or Co (or at least contains less than 5 at % of Mn and/or Co) and prevents Mn and/or Co diffusion from the metal oxide layer into the ring seals 20, in order to prevent the Mn and/or Co diffusion from the ring seals 20 to the adjacent electrolyte 5.

The corrosion barrier layer 34 may comprise a glass ceramic material described in U.S. Pat. No. 9,583,771 B2, issued Feb. 28, 2017 and incorporated herein by reference in its entirety. The corrosion barrier layer 34 may comprise a glass ceramic layer formed from a substantially glass barrier precursor layer containing at least 90 wt. % glass (e.g., 90-100 wt. % glass, such as around 99 to 100 wt. % amorphous glass and 0 to 1 wt. % crystalline phase) applied to a surface of interconnects in the SOFC stack. In one embodiment, the glass barrier precursor layer contains at least 90 wt. % glass and comprises:

45-55 wt. % silica ($SiO_2$);
5-10 wt. % potassium oxide ($K_2O$);
2-5 wt. % calcium oxide (CaO);
2-5 wt. % barium oxide (BaO);
0-1 wt. % boron trioxide ($B_2O_3$);
15-25 wt. % alumina ($Al_2O_3$); and
20-30 wt. % zirconia ($ZrO_2$) on an oxide weight basis.

In one preferred embodiment, a glass barrier precursor layer comprises:
44.6 wt. % silica;
6.3 wt. % potassium oxide;

2.4 wt. % calcium oxide;
2.4 wt. % barium oxide;
19.1 wt. % alumina;
0.1 wt. % boron trioxide; and
25.1 wt. % zirconia on an oxide weight basis.

In some embodiments, a chromium oxide layer 36 may be formed on the fuel side of the interconnect 10. In particular, chromium of the chromium-iron alloy interconnect 10 material may form a chromium oxide layer 36 that accumulates on the fuel side of the interconnect 10.

Fuel Cell Component Refurbishing

According to various embodiments of the present disclosure, systems and methods of refurbishing fuel cell stack components are provided. For example, at the end of the operating life of a fuel cell stack, the stack may be disassembled and components thereof may be recycled (i.e., reused in a new fuel cell stack) after being refurbished.

Figure 5:
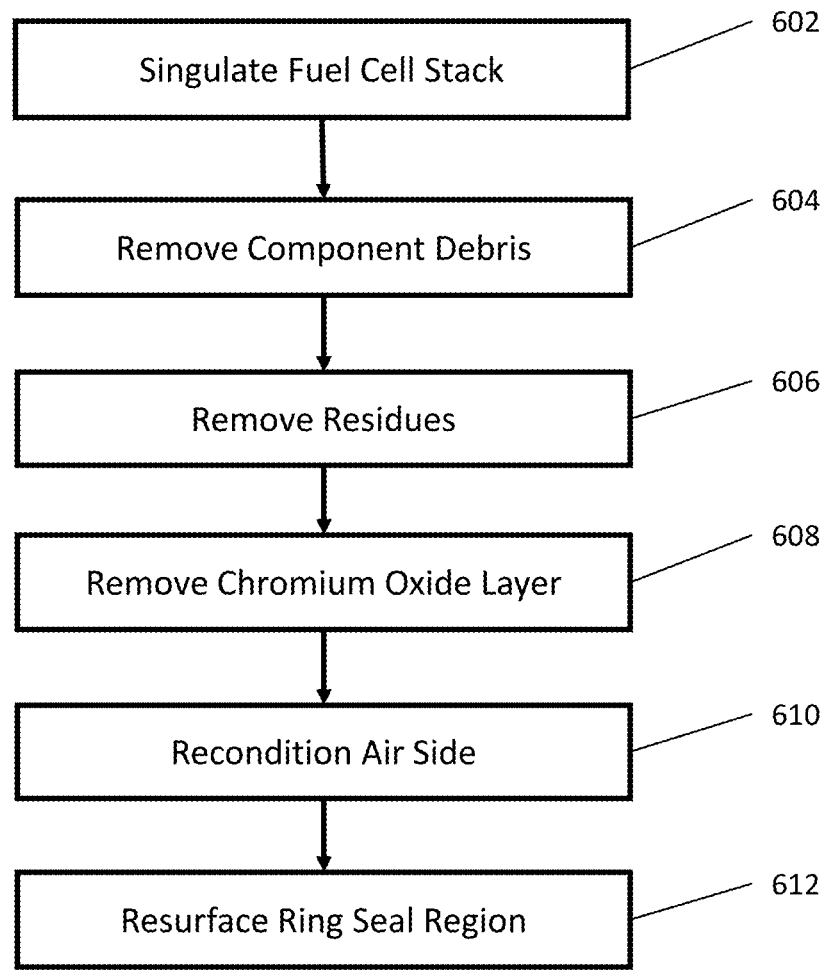
FIG. 5 is a process flow diagram illustrating a method of refurbishing fuel cell interconnects, according to various embodiments of the present disclosure.

FIG. 6 is a process flow diagram illustrating a method of recycling fuel cell interconnects, according to various embodiments of the present disclosure. Referring to FIGS. 1A, 4 and 5, in step 602, the fuel cell stack 100 may be may be removed from a fuel cell system and singulated to separate the interconnects 10 from one another.

Any suitable method of singulation may be used. For example, a stack may be singulated mechanically, hydraulically, or thermally, and fuel cell components may be removed therefrom, as disclosed in U.S. Pat. No. 8,535,841, issued on Sep. 17, 2013, and U.S. Pat. No. 10,756,355 B2, issued on Aug. 25, 2020, which are incorporated herein by reference in their entireties.

In step 604, stack component debris may be removed from each interconnect 10. For example, fuel cell electrolyte, seals, inks, and/or conductive layers, such as nickel mesh layers, which remain attached to the interconnect 10, may be removed. For example, a wire brush or compressed air may be used to remove such debris. In some embodiments, a fuel cell electrolyte may be cracked using a die in order to facilitate fuel cell component debris removal.

After removal of the debris, stack component residues may remain on the interconnect 10. For example, the residues may include glass, ceramic, and/or glass/ceramic material residues, such as residues from ceramic electrolyte, glass seals, and/or ceramic barrier layers, or the like, may remain on the interconnect 10. In particular, the residues may include the seal 20 and/or 24 residue, corrosion barrier layer 34 disposed on the ring seal regions 20R on the fuel side of the interconnect 10, and the chromium oxide layer 36 disposed on the fuel side of the interconnect 10.

In step 606 the air side and the fuel side of the interconnect 10 may be laser-irradiated to remove the residues. The air and fuel sides of the interconnect 10 may be laser irradiated in any order, or simultaneously. In particular, step 606 may include scanning at least portions of the fuel and air sides of the interconnect 10 with one or more pulsed laser beams, in order to heat the residues to a temperature sufficient to vaporize and/or dislodge the residues.

It has been determined that precise control of the irradiation of the interconnect 10 may allow for the removal of the residues without damaging the relatively expensive metal oxide layer 32 on the air side of the interconnect 10. For example, excessive localized heating of the interconnect 10 may result in the formation of cracks and/or may damage the metal oxide layer 32 on the interconnect. Accordingly, characteristics of the laser beam may be controlled, such as the power, pulse frequency, scan speed and/or beam spot diameter, such that the residues may be vaporized without the damaging the metal oxide layer 32 and/or the interconnect 10.

According to some embodiments, a single laser beam may be used to irradiate one or both of the fuel and air sides of the interconnect 10. In other embodiments, one or more laser beams, which may be generated by one or more laser sources, may be used to irradiate each side of the interconnect 10. Each laser beam may be controlled with a scanner configured to control scanning of the laser beam across the interconnect 10. For example, laser beams may be selectively scanned in a raster pattern, a vector pattern, a serpentine pattern, or the like, in order to heat the surface of the interconnect 10 to a temperature sufficient to vaporize the residues. Alternatively, the interconnect 10 may be moved in a support stage relative to the laser beam to scan the beam across the interconnect.

Accordingly, the residues may be removed from the interconnect 10 in a rapid manner Laser line speeds may exceed 24 inches per second (e.g., 25 to 500 inches per second) in some embodiments. Laser exposure times for the residues may be less than 1 sec (e.g., 0.05 to 0.9 sec). However, the present disclosure is not limited to any particular type of laser, travelling time, or exposure time. The laser beam may be configured vaporize and/or delaminate the fuel cell debris from the interconnect 10. For example, the laser may vaporize seals bonding other fuel cell debris to the interconnect 10, resulting in the removal of such materials.

In some embodiments, the laser beam(s) may be generated by a laser source, such as a pulsed infrared fiber laser source configured to generate a laser beam having a wavelength greater than 800 nm and less than 5,000 nm, such as wavelength ranging from about 1060 nm to about 1075 nm, such as from about 1062 nm to about 1066 nm, or about 1064 nm. A fiber laser includes a rare earth element doped optical fiber active gain medium. The rare earther elements may include erbium, ytterbium, neodymium, dysprosium, praseodymium, thulium and/or holmium. The laser source may have a peak power output ranging from 100 W to 3000 W, such as from 500 W to 1000 W. The laser source may generate a laser beam spot having a beam spot size (e.g., diameter) of 1.5 mm or less, such as 1 mm or less, such as about 0.5 mm to about 1 mm, such as about 0.6 mm to 0.8 mm. The present inventors determined that using a pulsed laser beam with the relatively small beam spot size (e.g., 1.5 mm or less) rather than a continuous laser beam with a relatively large beam spot size (e.g. 2 mm or greater) results in a higher peak power for a shorter duration, which is capable of removing the residue without vaporizing the metal oxide layer 32 or damaging the interconnect 10. Thus, the refurbished interconnect 10 does not have to be recoated with a relatively expensive metal oxide layer 32.

Figure 6A:
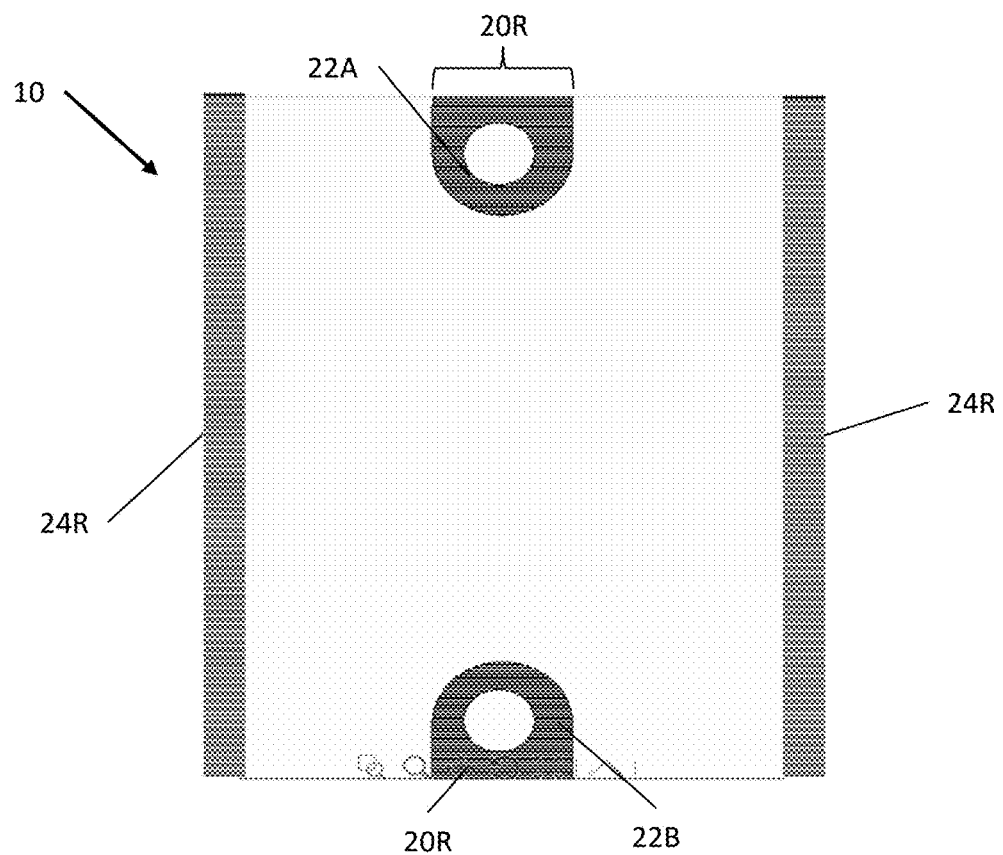
FIG. 6A-6B are plan views showing laser irradiation patterns that may be applied to the respective air and fuel sides of an interconnect, during the refurbishing method of FIG. 5.
Figure 6B:
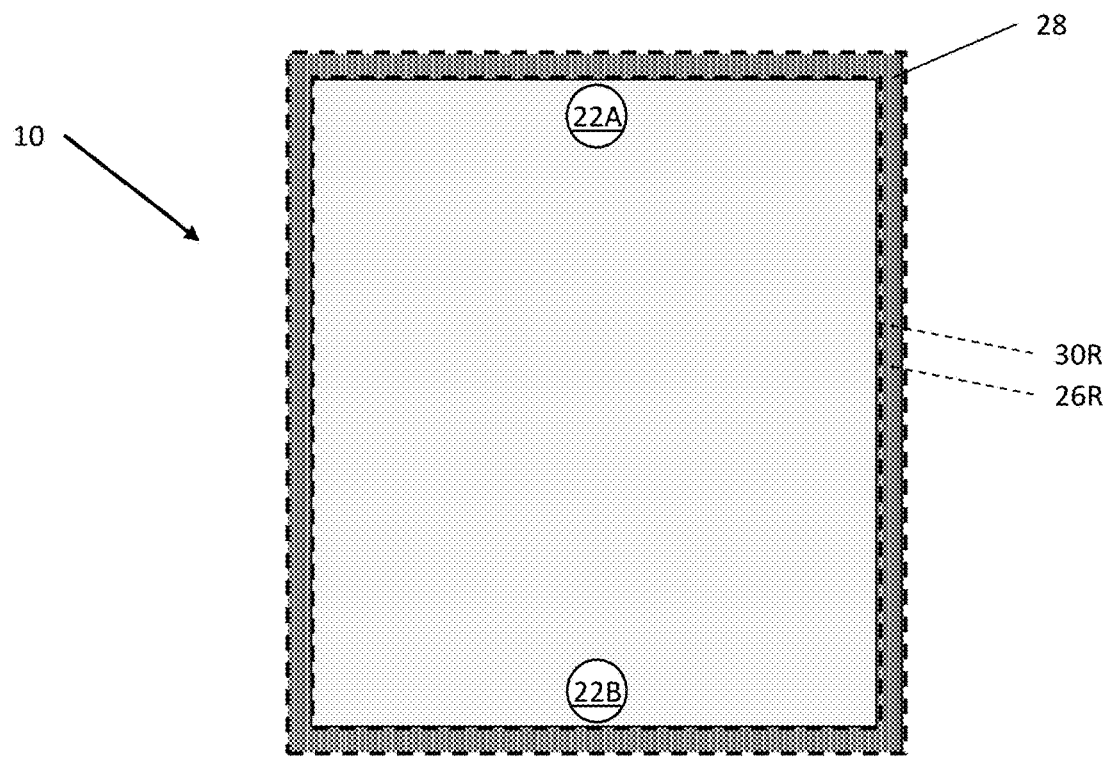
Figure 6C:
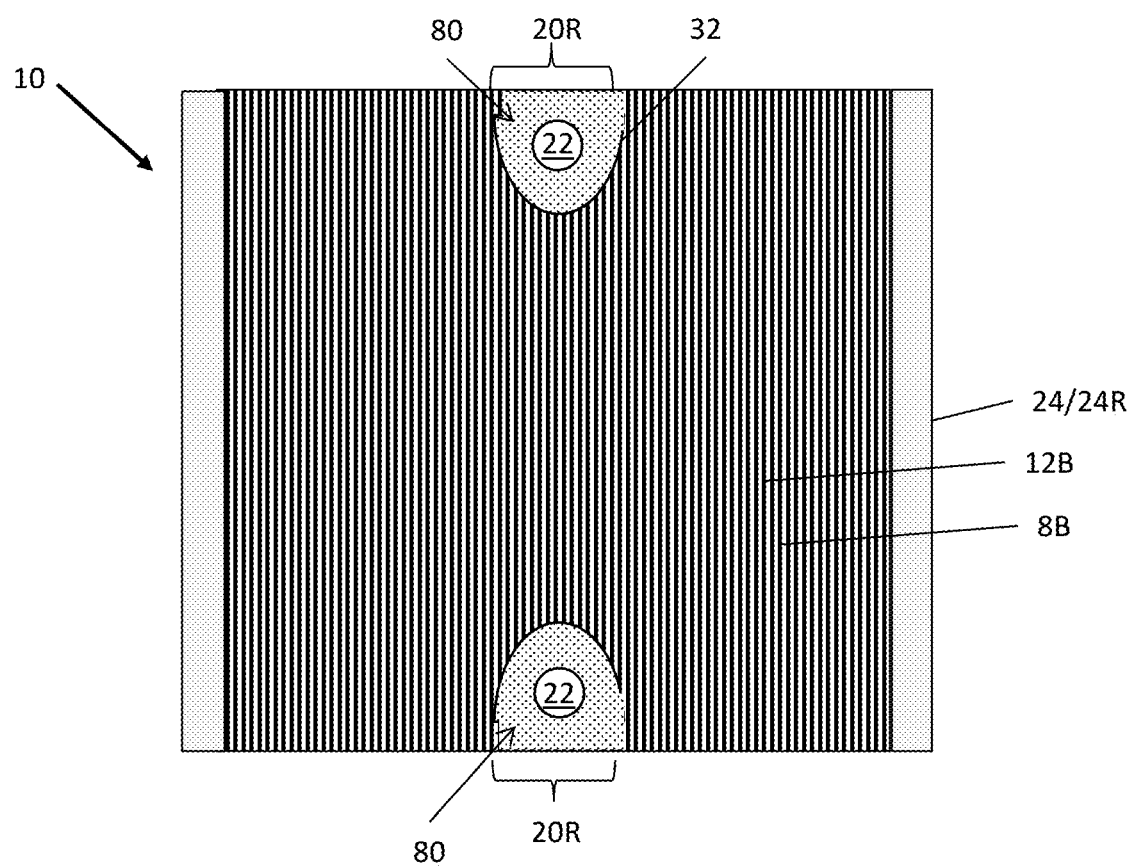
FIG. 6C is a plan view showing the air side of an interconnect after resurfacing according to the method of FIG. 5.

FIG. 6A illustrates laser a laser irradiation pattern that may be applied to the air side of a singulated interconnect 10, and FIG. 6B illustrates laser irradiation pattern that may be applied to the fuel side of the interconnect 10, according to various embodiments of the present disclosure. FIG. 6C is a top view of the air side of the interconnect 10, after resurfacing, according to various embodiments of the present disclosure.

Referring to FIGS. 5 and 6A, in step 606, the method may include scanning one or more a laser beams across the strip seal regions 24R and the ring seal regions 20R of the air side of the interconnect 10, using one or more scanning passes by moving the laser beam and the interconnect relative to each other. Either the laser beam and/or the interconnect 10 may be moved to generate a scan of the laser beam across the interconnect 10.

For example, step 606 may include performing a first scanning pass, during which the strip seal regions may be scanned with a first laser beam. The first laser beam may be a pulsed laser beam having a peak power ranging from about 800 W to about 1250 W, such as from about 900 W to about 1100 W, from about 950 W to about 1050 W, or about 1000 W. The first laser beam may have a pulse frequency ranging from about 5 kHz to about 15 kHz, such as from about 8 kHz to about 13 kHz, or about 10 kHz to 11 kHz. The first laser beam may have a scanning speed ranging from about 2500 mm/s to about 3500 mm/s, such as from about 2750 mm/s to about 3250 mm/s, or about 3000 mm/s. The first laser beam may have a beam spot size (e.g., diameter) of 1.5 mm or less, such as 1 mm or less, such as about 0.5 mm to about 1 mm, such as about 0.6 mm to 0.8 mm. The first laser beam may have a pulse width ranging from about 50 ns to about 150 ns, such as from about 75 ns to about 125 ns, or about 100 ns. The frequency and/or dwell time may be changed during the first scanning pass to sequentially remove different residues (e.g., to remove seal reside followed by removing the corrosion barrier layer residue).

Step 606 may include performing a second scanning pass, during which the strip seal regions 24R may be scanned for a second time with a second laser beam. The second laser beam may be a pulsed laser beam different from the first laser beam using during the first scanning pass. The second laser beam may have at least one of a lower peak power, a shorter pulse width, a faster scanning speed, a smaller beam spot size, and/or a higher pulse frequency than the first laser beam used during the first scanning pass. The smaller beam spot size of the second laser beam results in a higher power density than that of the first laser beam. The second laser beam may have a peak power ranging from about 250 W to about 750 W, such as from about 400 W to about 600 W, from about 450 W to about 550 W, or about 500 W. The second laser beam may have a pulse frequency ranging from about 20 kHz to about 40 kHz, such as from about 25 kHz to about 35 kHz, or about 30 kHz. The second laser beam may have a scanning speed ranging from about 4500 mm/s to about 5500 mm/s, such as from about 4750 mm/s to about 5250 mm/s, or about 5000 mm/s. The second laser beam may have a beam spot size (e.g., diameter) of less than 0.5 mm, such as a beam spot size ranging from about 0.05 mm to about 0.15 mm, such as from about 0.075 mm to about 0.125 mm, or about 0.1 mm. The second laser beam may have a pulse width ranging from about 15 ns to about 35 ns, such as from about 20 ns to about 30 ns, or about 25 ns. The second laser beam may reflow the metal oxide layer 32 in the strip seal regions 24R without removing (e.g., vaporizing) the metal oxide layer 32. Therefore, the metal oxide layer may be smoother and denser (e.g., with rough spots removed and/or pores filled) than after the first scanning pass.

Step 606 may include performing a third scanning pass, during which the ring seal regions 20R are scanned for the first time using a third laser beam. The third laser beam may have similar characteristics to the first laser beam.

Step 606 may include performing a fourth scanning pass, during which the ring seal regions 20R are scanned for a second time using a fourth laser beam. The fourth laser beam may have the similar characteristics to the second laser beam. The fourth laser beam may reflow the metal oxide layer 32 in the ring seal regions 20R without vaporizing the metal oxide layer 32. Therefore, the metal oxide layer may be smoother and denser (e.g., with rough spots removed and/or pores filled) than after the third scanning pass.

However, in some embodiments, the ring seal regions 20R may be scanned before, or at the same time as, the strip seal regions 24R are scanned. As such, the present disclosure is not limited to any particular scanning sequence. Thus, in some embodiments, step 606 may be modified such that the ring seal regions 20R and the strip seal regions 24R may be scanned using only two scanning passes. For example, step 606 may be modified such that the ring seal regions 20R and the strip seal regions 24R are both scanned during the first scanning pass, using the first laser beam, and then scanned against during the second scanning path using the second laser beam.

Referring to FIGS. 5 and 6B, step 606 may include performing a fifth scanning pass, during which the frame seal region 26R of the fuel side of the interconnect 10 is scanned using a fifth laser beam. The fifth laser beam may have substantially the same characteristics as the first laser beam.

Step 606 may include performing a sixth scanning pass, during which the frame seal region 26R may be scanned for a second time using a sixth laser beam. The sixth laser beam may have a lower power and/or a faster scanning speed than the fifth laser beam. The sixth laser beam may be a pulsed laser beam having a peak power ranging from about 250 W to about 750 W, such as from about 400 W to about 600 W, from about 450 W to about 550 W, or about 500 W. The sixth laser beam may have a pulse frequency ranging from 5 kHz to about 15 kHz, such as from about 8 kHz to about 13 kHz, or about 10 kHz to 11 kHz. The sixth laser beam may have a scanning speed ranging from about 4500 mm/s to about 5500 mm/s, such as from about 4750 mm/s to about 5250 mm/s, or about 5000 mm/s. The sixth laser beam may have a beam spot diameter ranging from about 0.15 mm to about 0.35 mm, such as from about 0.20 mm to about 0.30 mm, or about 0.25 mm. The sixth laser beam may have a pulse width ranging from about 50 ns to about 150 ns, such as from about 75 ns to about 125 ns, or about 100 ns.

Referring to FIGS. 4, 5, and 6C, in step 608, the method may include removing the chromium oxide layer 36 from the fuel side of the interconnect 10. In particular, step 608 may include performing a seventh scanning pass, during which a seventh laser beam may be scanned across all, or substantially all, of the fuel side of the interconnect 10, in one or more passes, in order to vaporize the chromium oxide layer 36. The characteristics of the seventh laser beam may be set such that the chromium oxide layer 36 is removed without damaging the underlying fuel side of the interconnect 10.

The seventh laser beam may have at least one of a lower power, a higher frequency, a faster scanning speed and/or a shorter pulse width than the sixth laser beam. For example, the seventh laser beam may be a pulsed laser beam having a peak power ranging from about 200 W to about 600 W, such as from about 300 W to about 500 W, from about 350 W to about 450 W, or about 400 W. The seventh laser beam may have a pulse frequency ranging from about 20 kHz to about 40 kHz, such as from about 25 kHz to about 35 kHz, or about 30 kHz. The seventh laser beam may have a scanning speed ranging from about 7500 mm/s to about 8500 mm/s, such as from about 7750 mm/s to about 8250 mm/s, or about 8000 mm/s. The seventh laser beam may have a beam spot diameter ranging from about 0.6 mm to about 1.0 mm, such as from about 0.7 mm to about 0.9 mm, or about 0.8 mm. The seventh laser beam may have a pulse width ranging from about 15 ns to about 35 ns, such as from about 20 ns to about 30 ns, or about 25 ns.

Referring again to FIGS. 4 and 5, in step 610, the method may include reconditioning the air side of the interconnect 10. In particular, step 610 may include scanning an eighth laser beam across all or substantially all of the air side of the interconnect 10, during an eight scanning pass, in order to recondition the metal oxide layer 32. The eighth laser beam may have substantially the same characteristics as the first laser beam.

The characteristics of the eighth laser beam may be set such that the metal oxide layer 32 may be partially melted to smooth and densify the surface of the metal oxide layer 32 and/or to remove contaminants therefrom. In particular, the metal oxide layer 32 may be heated to a temperature sufficient to at least partially liquefy the surface of metal oxide layer 32, resulting in the reflow of the liquefied metal oxide into pores of the remaining metal oxide layer 32. The process may increase the density of the metal oxide layer 32 and may remove any relatively rough surface regions of the metal oxide layer 32.

The scanning patterns may include horizontal scan lines as shown in FIG. 6A. However, the present disclosure is not limited to any particular scanning pattern or scan line orientation. For example, the scanning patterns may include vertical scan lines, non-vertical scan lines, horizontal scan lines, serpentine scan lines, or any combination thereof.

Referring to FIGS. 5 and 6C, in step 612, the method may include resurfacing the ring seal regions 20R of the air side of the interconnect 10. In particular, the surface area of the metal oxide layer 32 in the ring seal regions 20R may be increased by roughening or drilling, in order to increase adhesion between the metal oxide layer 32 and a subsequently deposited barrier layer.

In particular, step 612 may include laser drilling the ring seal regions 20R to form micro cavities 80 in the metal oxide layer 32 or both the metal oxide layer 32 and the interconnect 10. The microcavities 80 may have a diameter of about 25 μm to about 200 μm, such as from about 50 μm to about 100 μm, or about 75 μm. At least one thousand (e.g., 1,000 to 10,000, such as 5,000 to 6,000) micro cavities 80 may be formed in each ring seal region 20R. The same pulsed laser beam as the fourth laser beam may be used for laser drilling except that the beam spot size is reduced to 200 microns or less, such as a diameter of 25 μm to about 200 μm, such as from about 50 μm to about 100 μm, or about 75 μm.

In some embodiments, step 612 may include depositing a corrosion barrier layer 34, as shown in FIG. 4, on the ring seal regions 20R, after resurfacing the ring seal regions 20R. The microcavities 80 improve the adhesion of the corrosion barrier layer 34 to the metal oxide layer 32.

The refurbishing process may leave no visible trace of fuel cell debris. In addition, the interconnect remains free of cracks and/or other damage due that may occur due to excessive heating during a recycling process. In addition, the chromium oxide layer 36 can be removed from the fuel side, and the corrosion barrier layer 34 can be removed from the air side of the interconnect 10 without removing the relatively expensive metal oxide layer 32.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of refurbishing a singulated fuel cell stack interconnect, comprising:
   scanning a first pulsed laser beam on an air side of the interconnect to vaporize seal and corrosion barrier layer residue without vaporizing a metal oxide layer located on the air side of the interconnect below the corrosion barrier layer residue; and
   scanning a second pulsed laser beam which is different from the first pulsed laser beam on the exposed metal oxide layer on the air side of the interconnect to reflow the metal oxide layer without removing the metal oxide layer,
   wherein the metal oxide layer comprises at least one of lanthanum strontium manganite or manganese cobalt oxide spinel.

2. The method of claim 1, wherein the second pulsed laser beam has least one of a lower peak power, a shorter pulse width, a higher scanning speed, a smaller beam spot size, or a higher pulse frequency than the first pulsed laser beam.

3. The method of claim 2, wherein the second pulsed laser beam has at least two of the lower peak power, the shorter pulse width, the higher scanning speed, the smaller beam spot size, or the higher pulse frequency than the first pulsed laser beam.

4. The method of claim 2, wherein the second pulsed laser beam has the smaller beam spot size and a higher power density than the first pulsed laser beam.

5. The method of claim 4, wherein the first pulsed laser beam has a beam spot size less than 1.5 mm, and the second pulsed laser beam has a beam spot size of less than 0.5 mm.

6. The method of claim 2, wherein:
   the first pulsed laser beam has:
      a peak power ranging from about 800 W to about 1250 W;
      a frequency ranging from about 5 kHz to about 15 kHz;
      a scanning speed ranging from about 2500 mm/s to about 3500 mm/s;
      a beam spot size ranging from about 0.5 mm to about 1 mm; and
      a pulse width ranging from about 50 ns to about 150 ns; and
   the second pulsed laser beam has:
      a peak power ranging from about 250 W to about 750 W;
      a frequency ranging from about 20 kHz to about 40 kHz;
      a scanning speed ranging from about 4500 mm/s to about 5500 mm/s;
      a beam spot size ranging from about 0.05 mm to about 0.15 mm; and
      a pulse width ranging from about 15 ns to about 35 ns.

7. The method of claim 1, wherein the interconnect comprises:
   fuel holes extending through the interconnect;
   air channels, strip seal regions disposed on opposing sides of the air channels, and ring seal regions surrounding the fuel holes located on the air side of the interconnect; and
   fuel channels and a frame seal region surrounding the fuel channels located on a fuel side of the interconnect which is opposite to the air side of the interconnect.

8. The method of claim 7, wherein:
   the step of scanning the first pulsed laser beam comprises scanning the first pulsed laser beam in at least one of the ring seal regions and the strip seal regions; and the step of scanning the second pulsed laser beam comprises scanning the second pulsed laser beam in the air channels and in at least one of the ring seal regions and the strip seal regions such that the metal oxide layer becomes smoother and denser in the air channels and in at least one of the ring seal regions and the strip seal regions.

9. The method of claim 7, wherein:
the interconnect comprises a chromium-iron alloy; and
the corrosion barrier layer residue comprises a glass-ceramic material.

10. The method of claim 9, further comprising removing solid oxide fuel cell ceramic electrolyte debris from the interconnect.

11. The method of claim 10, further comprising singulating a solid oxide fuel cell stack comprising interconnects and solid oxide fuel cells to obtain the singulated fuel cell stack interconnect.

12. The method of claim 11, further comprising vaporizing stack residue from the fuel side of the interconnect by scanning a third pulsed laser beam on the frame seal region followed by scanning a fourth pulsed laser beam on the frame seal region.

13. The method of claim 12, wherein the third pulsed laser beam has at least one of a slower scanning speed and a higher peak power than the fourth laser beam.

14. The method of claim 12, further comprising scanning a fifth pulsed laser beam on the fuel channels and the frame seal region on the fuel side of the interconnect to vaporize a chromium oxide layer.

15. The method of claim 14, where the fifth pulsed laser beam has at least one of faster scanning speed, a lower peak power, a higher frequency and a shorter pulse width than the fourth pulsed laser beam.

16. A method of refurbishing a singulated fuel cell stack interconnect comprising fuel holes extending through the interconnect, air channels, strip seal regions disposed on opposing sides of the air channels, and ring seal regions surrounding the fuel holes located on the air side of the interconnect, the method comprising:
scanning a first pulsed laser beam on an air side of the interconnect to vaporize seal and corrosion barrier layer residue without vaporizing a metal oxide layer located on the air side of the interconnect below the corrosion barrier layer residue;
scanning a second pulsed laser beam which is different from the first pulsed laser beam on the exposed metal oxide layer on the air side of the interconnect to reflow the metal oxide layer without removing the metal oxide layer; and
forming microcavities through the metal oxide layer in the-seal ring regions by laser drilling after the step of scanning the second pulsed laser beam.

17. The method of claim 16, wherein the microcavities have a diameter of about 25 µm to about 200 µm, and extend into the air side of the interconnect through the metal oxide layer.

18. The method of claim 16, further comprising:
depositing a corrosion barrier layer on the metal oxide layer and into the microcavities at least in the seal ring regions; and
depositing a seal material on the corrosion barrier layer in the seal ring regions.

19. The method of claim 1, wherein the first and the second pulsed laser beams are generated by an infrared pulsed fiber laser having a wavelength greater than 800 nm and less than 5,000 nm.

* * * * *